Patented July 16, 1935

2,008,017

UNITED STATES PATENT OFFICE 2,008,017

CONDENSATION PRODUCTS OF DIISO-BUTYLENE AND PHENOLS

William F. Hester, Drexel Hill, Pa., assignor to Röhm & Haas Company, Philadelphia, Pa.

No Drawing. Application March 23, 1932, Serial No. 600,826

11 Claims. (Cl. 260—154)

This invention relates to diisobutylphenols and to a process for preparing same by the condensation of diisobutylene with phenol and substituted phenols.

Diisobutylphenol is a new compound which is believed to be either the ortho- or the para- derivative, namely 2- or 4- [α,α,γ,γ-tetramethyl]-butylphenol having following probable constitution:—

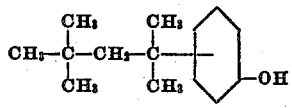

One object of this invention is to produce diisobutylphenol in high yield and purity by a very simple and economical method.

Another object of this invention is to provide diisobutylphenol as a new compound which is adapted for use as an antiseptic, fungicidal, or bactericidal agent; or as an intermediate for preparing dyestuffs, artificial tanning agents, wetting-out agents, and pharmaceutical preparations.

A further object of this invention is to provide a method for preparing substituted diisobutylphenols and higher homologues and substitution products thereof such as triisobutyl-, and diisoamylphenols, in which the phenolic nucleus may contain halogen, alkyl-, aryl-, or nitro groups as additional substituents, it being understood that the term "phenols" as used herein refers to either monocyclic, polynuclear, or polycyclic phenols.

Other objects will appear hereinafter.

In accordance with my invention, I have found that when a mixture of phenol and diisobutylene in reacting proportions, preferably eqimolecular amounts, is treated with a very small quantity of concentrated sulphuric acid, i. e. an amount of sulphuric acid substantially less than a molecular equivalent quantity; at a temperature preferably below 70° C., and for best results at about 0-25° C., condensation occurs smoothly to form diisobutylphenol in practically quantitative yield. The amount of sulphuric acid (96% strength) used may be as low as 0.075 mole per mole of phenol. An amount of 96% sulphuric acid corresponding to about 0.13-0.30 moles per mole of phenol gives excellent results. As the quantity of sulphuric acid is increased, or if the temperature is not kept low, oily or resinous products are formed which decrease the yield. If, however, the proper precautions are taken to keep the temperature at about 10-25° C. and to use small quantities of sulphuric acid added slowly with stirring over a period of time as described in more detail below, practically no ethers or deleterious by-products are formed, and the mixture sets to a gel which rapidly solidifies to a hard crystalline mass of diisobutylphenol. This may be purified, if necessary, by washing with water or by recrystallization from light petroleum or other suitable medium.

This reaction, involving what appears to be a catalytic condensation induced by the presence of small amounts of sulphuric acid was entirely unexpected, since it had already been known in the art that phenol condenses with diisobutylene in the presence of a molecular equivalent amount of concentrated sulphuric acid at or below 0° C. to give chiefly diisobutylphenylether, (Niederl and Natelson, Jour. Amer. Chem. Soc. 53, 276 (1931)) instead of diisobutylphenol.

Other para-alkylated phenols have, it is true, in the past been prepared by the action of equimolecular amounts of unsaturated hydrocarbon such as isoamylene or styrene upon phenol in a cold mixture of 1 volume of concentrated sulphuric acid and 9 volumes glacial acetic acid, in the ratio of about 2 parts by weight of sulphuric acid to 1 part of phenol (Konig, Ber. 24, 3889 (1891)); or by the condensation of phenol with alcohols in the presence of 10-15 moles of 70-80% sulphuric acid at 60-80° C. (Meyer and Bernhauer, Monatshefte 53-54, 721-752 (1929)). Such processes are not applicable, however, for preparing diisobutylphenol from phenol and diisobutylene, due to the extreme ease with which resinous or oily bodies are thereby formed. Diisobutylphenyl is very susceptible to the action of heat and excessive amounts of acid and cannot be obtained under such strenuous conditions.

The example below illustrates the preferred manner of making diisobutylphenol, it being understood of course that the quantities of the reactants may be varied to a considerable extent and that the length of time of reaction, the strength of the sulphuric acid, as well as the temperature may have to be varied somewhat when larger or smaller sized batches are made or when the rate of stirring is different.

Example 1

In a vessel which is resistant to sulphuric acid such as any glass, enameled or lead-lined kettle fitted with a rapidly rotating stirrer, there is placed a mixture of substantially equimolecular quantities of phenol and diisobutylene, say 94 grams phenol and 112 grams diisobutylene. The diisobutylene used is obtained by treating tertiary butyl alcohol with 50% sulphuric acid according to methods already known. It should preferably boil between 101° and 103° C. at normal pressure. Such a product is reasonably free from isobutylene and tri-isobutylene. According to Whitmore and Wrenn (Jour. Amer. Chem. Soc. 53, 3136 (1931)) it consists of two isomeric trimethyl-pentenes namely 2,4,4-trimethylpentene-1 and 2,4,4-trimethylpentene-2.

To the above mixture of phenol and diisobutylene which has been cooled to 15–18° C. there is gradually introduced 2–4 grams of 96% of sulphuric acid added dropwise or in a slow stream with constant and vigorous agitation.

During and shortly after the addition of acid there is a tendency for the temperature to rise to 30–35° C. and the mixture becomes completely fluid. Cooling is then applied with stirring, so that a temperature of 20–25° C. is reached as quickly as possible. Then the remainder of 15 grams of 96% sulphuric acid (0.15 moles) is added very slowly during 20–30 minutes while the temperature is held at 20–25° C. After about 1½ hours of stirring, crystals of diisobutylphenol begin to separate. The mixture gradually becomes more viscous due to the formation of crystals. This next forms a gel and finally sets to a hard crystalline cake. The latter is removed and washed thoroughly with water to remove sulphuric acid and traces of sulphonic acids or unchanged phenol. The crude diisobutylphenol forms colorless needlelike crystals which are filtered off and dried. Upon recrystallization from petroleum ether it shows a melting point of 84–85° C. The yield varies from about 85% to 95% of the theoretical quantity.

Diisobutylphenol is only very slightly soluble in water. It dissolves readily in organic solvents such as alcohol, ether, chloroform, and benzene but is soluble only to a limited extent in cold petroleum ether or ligroin. With aqueous solutions of caustic alkalies such as sodium hydroxide or potassium hydroxide it produces phenates which are only very slightly soluble in water and which have a soapy consistency.

To prove that the compound is actually a phenol and not an ether, the diisobutylphenol obtained above was boiled in excess sodium hydroxide solution with mono-chloracetic acid, whereby the diisobutyl phenoxy acetic acid derivative, M. P. 108–109° C. (recrystallized from ligroin) was obtained.

Despite the fact that diisobutylene consists of two isomeric trimethylpentenes, only one diisobutylphenol is formed. The reaction may be formulated as follows:

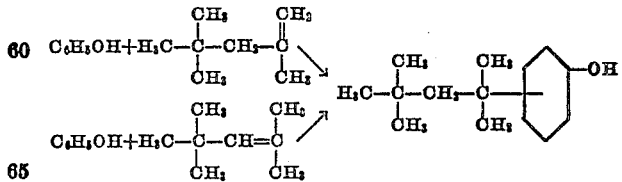

It is obvious that in the above process the proportions and temperatures, as well as the concentration of the sulphuric acid may be varied to some extent without departing from the scope of this invention.

*Example 2*

A mixture of 108 grams (1 mole) of o-cresol and 112 grams (1 mole) diisobutylene is treated gradually with 31.3 grams (0.3 mole) of 96% sulphuric acid at about 10–15° C. with cooling as described in Example 1. After stirring for about 5 hours, the reaction product which forms a viscous oil, is washed thoroughly with water, steam distilled to remove unchanged diisobutylene, etc., and set aside to crystallize. The waxy product thus obtained forms colorless crystals melting at 49–50° C. after recrystallization from petroleum ether.

This is the melting point of the product Niederl obtained by rearranging diisobutyl o-cresyl ether to the phenol (Jour. Amer. Chem. Soc. 53, 276 (1931)).

*Example 3*

To a mixture of 94 g. (1 mole) of phenol and 112 g. (1 mole) of diisobutylene stirred at 25° is slowly added 23 g. (0.15 mole) of phosphorus oxychloride. The temperature rises rapidly to 40°. An ice bath is used to prevent the temperature from going above 40°. After 15 minutes the bath is removed and the mixture is stirred for 4 hours at room temperature. The viscous oil is washed with water and steam distilled to remove unchanged phenol and diisobutylene. The residue crystallizes on cooling. These crystals, washed with petroleum ether, melt at 83–84°; mixed with the product from Example #1 they melt at the same temperature.

*Example 4*

To a mixture of 144 grams (1 mole) of 2-naphthol (betanaphthol) and 112 grams (1 mole) of diisobutylene is slowly added with stirring 14.7 grams (0.15 mole) of 94% sulfuric acid. The temperature rises rapidly to about 70° and the almost dry mixture becomes a liquid which sets to a solid in about 10 minutes, the temperature rising to 78°. The crude product is taken up in ether, washed with 10% potassium hydroxide solution to remove unchanged 2-naphthol, and recrystallized from petroleum ether to give diisobutyl naphthol melting 128–9°.

*Example 5*

To a mixture of 108 grams (1 mole) of paracresol and 112 grams (1 mole) of diisobutylene is slowly added with stirring 31.3 grams (0.3 mole) of 94% sulphuric acid. The product is purified as in Example #2. The diisobutyl p-cresol melts at 46–47°.

Instead of using sulphuric acid in the above condensations one may use other acidic condensing agents notably anhydrous zinc chloride, ferric chloride, aromatic or aliphatic sulphonic acids, phosphoric acid, phosphorus pentoxide and hydrogen halides. The yield and purity of the product is however inferior to that obtained by the use of sulphuric acid as a condensing agent.

In the above reactions with diisobutylene other phenols and substitution products thereof may be used in lieu of phenol itself, such as chlorphenols, cresols, chlorcresols, nitrophenols, phenylphenols, naphthols, phenolsulfonic acids, and the like to yield the corresponding diisobutylated derivatives.

Furthermore the reaction may be applied to higher homologues of diisobutylene including triisobutylene, and diisoamylene in which case, triisobutylphenol and diisoamyl phenol respectively may be obtained as low melting solids or viscous oils.

It is also understood that inert solvents may be used in the condensation to promote better agitation or for obtaining a more homogeneous mixture; such solvents as water, trichlorethylene, carbon tetrachloride and the like being suitable therefor.

It is apparent to one versed in the art that variation can be made in the temperature, conditions of operation, etc. set forth in the above examples without departing from the spirit of the invention the scope of which is limited only by the following claims.

I claim:

1. A process for preparing a alpha, alpha, gamma, gamma-tetramethyl-butylphenol which comprises condensing a mixture of a phenol and diisobutylene in substantially equimolecular proportions, with concentrated sulphuric acid in an amount substantially less than a molecular equivalent quantity.

2. In the process for preparing alpha, alpha, gamma, gamma-tetramethyl-butylphenol from phenol and diisobutylene the step which comprises carrying out the reaction in the presence of an amount of concentrated sulphuric acid equivalent to substantially .075 to 0.30 mole per mole of phenol.

3. The process for preparing alpha, alpha, gamma, gamma-tetramethyl-butylphenol which comprises condensing phenol and diisobutylene in the presence of concentrated sulphuric acid of an amount substantially .075 to 0.30 mole per mole of phenol at a temperature of substantially 0° to 70° C.

4. A process for preparing alpha, alpha, gamma, gamma - tetramethyl - butylphenol which comprises condensing a mixture of phenol and diisobutylene in substantially equimolecular proportions with concentrated sulphuric acid of substantially 96% strength in an amount equal to from .075 to 0.30 mole per mole of phenol, at a temperature of from 0° to 35° C.

5. A process for preparing a alpha, alpha, gamma, gamma-tetramethyl-butylphenol which comprises condensing a phenol and diisobutylene in substantially equimolecular proportions with an acidic condensing agent in an amount substantially less than a molecular equivalent quantity.

6. A process for preparing alpha, alpha, gamma, gamma - tetramethyl - butylphenol which comprises condensing phenol and diisobutylene in substantially equimolecular proportions with an acidic condensing agent in an amount equivalent to substantially .075 to 0.30 mole per mole of phenol.

7. A process as described in claim 6 carried out at temperatures from 0° to 70° C.

8. A process as described in claim 5 in which the condensing agent is present in an amount of from .075 to 0.30 mole per mole of phenol.

9. A process as described in claim 5 carried out at temperatures from 0° to 70° C.

10. The compound, alpha, alpha, gamma, gamma-tetramethyl-butyl B-naphthol having the structure

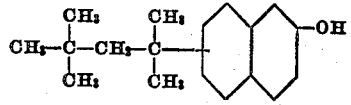

11. Process for preparing a substituted phenol which comprises condensing a phenol and diisobutylene with an acidic condensing agent in an amount substantially less than a molecular equivalent quantity.

WILLIAM F. HESTER.